Sept. 16, 1958  S. J. GALLA  2,852,292
CONVERTIBLE TOP POWER HEADER LOCK
Filed March 14, 1956  2 Sheets-Sheet 1

S. J. GALLA
*INVENTOR.*

ATTORNEYS

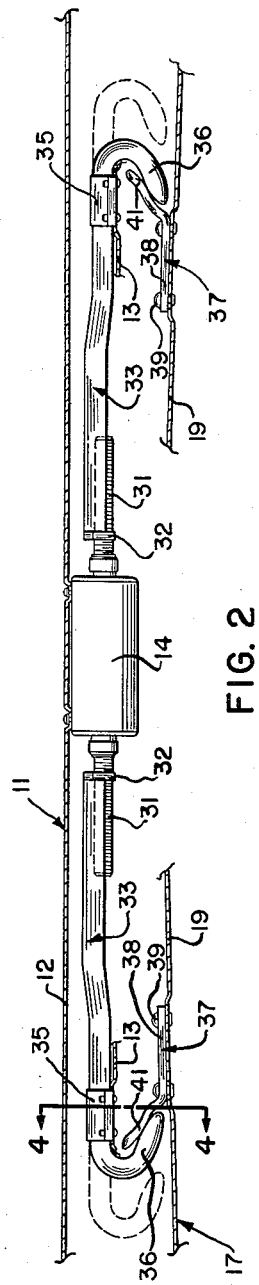
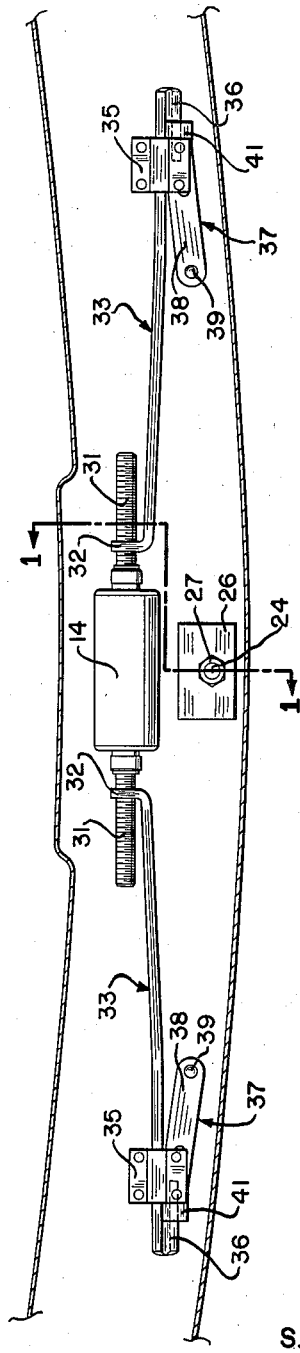

United States Patent Office 2,852,292
Patented Sept. 16, 1958

2,852,292

CONVERTIBLE TOP POWER HEADER LOCK

Stephen J. Galla, Detroit, Mich., assignor to Ford Motor Company, Dearborn, Mich., a corporation of Delaware Application March 14, 1956, Serial No. 571,429

3 Claims. (Cl. 292—25)

This invention relates generally to lock mechanisms, and has particular reference to a power header lock for the convertible top of a motor vehicle.

The invention as shown herein may be applied to a motor vehicle having a retractable roof, either of the hard or soft type, and has for its purpose the provision of an automatic power operated header lock which will properly center the roof with respect to the windshield header and automatically clamp it in closed position. In an embodiment of the invention, a pair of latch elements are mounted upon the roof header for transverse sliding movement and have hook shaped retaining portions at their ends for engagement with keeper elements mounted upon the windshield header. An electric motor is centrally mounted upon the roof header and has oppositely extending threaded shafts engaging threaded portions of the slidable latch elements to simultaneously move the latch elements in opposite directions. The retaining portions of the latch elements and the keeper elements are so designed as to automatically clamp the roof header to the windshield header, thus assuring proper sealing engagement therebetween.

Other objects and advantages of this invention will be made more apparent as this description proceeds, particularly when considered in connection with the accompanying drawings wherein:

Figure 2 is a transverse vertical cross sectional view of the construction shown in Figure 1.

Figure 3 is a plan view of the construction shown in Figure 2.

Figure 1:
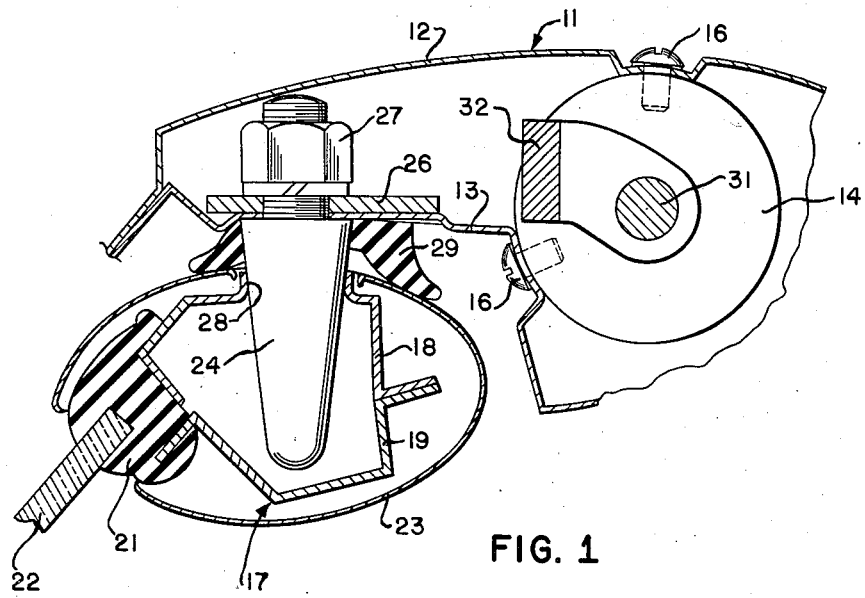
Figure 1 is an enlarged vertical cross sectional view through the central portion of the roof header and the adjacent windshield header of a motor vehicle incorporating the present invention, taken substantially on the line 1—1 of Figure 3.

Referring now to the drawing, and particularly to Figure 1, the reference character 11 refers generally to a roof header located at the forward portion of the retractable vehicle roof. The header 11 is formed of upper and lower sheet metal sections 12 and 13 suitably welded together to form a box section header. An electric motor 14 is mounted within the roof header and is secured to the sections 12 and 13 thereof by fastening elements 16.

In the closed position of the roof, the roof header 11 overlaps a windshield header 17 having cooperating sheet metal sections 18 and 19 suitably welded together to form a box section header. A rubber weatherstrip 21 is carried by the windshield header and supports the upper edge of the windshield glass 22. A decorative chrome plated sheet metal enclosure 23 encircles the windshield header 17.

As best seen in Figures 1 and 3, a tapered centering pin 24 is mounted upon the roof header 11, projecting through aligned openings in the lower section 13 of the header and in a reinforcing plate 26, and being secured to the roof header by means of a nut 27. The centering pin 24 is adapted to project through a flanged opening 28 in the upper section 18 of the windshield header 17 to properly center the two during the closing movement of the roof. A transversely extending rubber weatherstrip 29 is carried by the roof header 11 and engages the upper portion of the windshield header 17 to provide a seal therebetween in the closed position of the roof.

Figure 4:
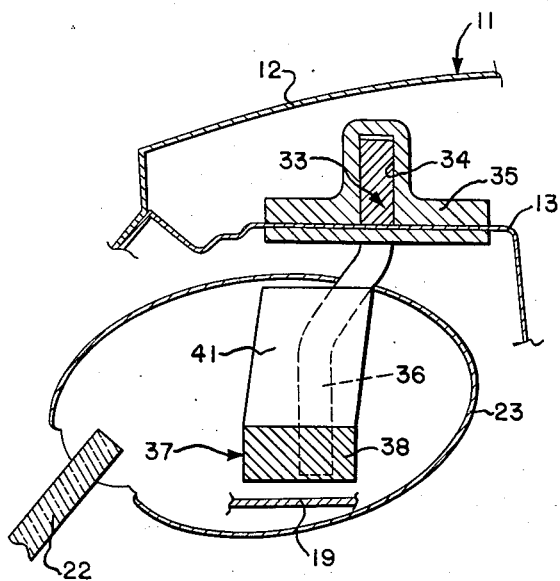
Figure 4 is an enlarged cross sectional view taken on the line 4—4 of Figure 2.

Referring now to Figures 2, 3, and 4, the electric motor 14 has oppositely directed aligned threaded shafts 31 threadedly engageable with tapped openings in the end flanges 32 of a pair of transversely extending latch elements 33. The latch elements 33 are in the form of elongated bars of rectangular cross section, and have intermediate portions slidably received within channel shaped guideways 34 formed in guide members 35 mounted upon the lower section 13 of the roof panel 11.

Outwardly beyond the guide members 35 the latch elements 33 are formed with hook shaped retaining end portions 36 projecting through elongated openings in the lower section 13 of the roof header. The hook shaped retaining end portions 36 of the latch elements are adapted to engage keeper elements 37 mounted upon the lower section 19 of the windshield header 17. Each keeper element 37 comprises a base 38 secured by fastening elements 39 to the windshield header section 19, and integral upwardly and outwardly projecting end portions 41.

The operation of the mechanism is as follows:

With the roof in open position, the latch elements 33 are extended so that the hook shaped retaining end portions 36 occupy the positions shown in dotted lines in Figure 2. Under either manual or power operation the roof is moved to a position such that the roof header 11 overlaps the windshield header 17, and the electric motor 14 is then either automatically or manually started, rotating the opposed threaded shafts 31. The rotation of the shafts 31 cause the latch elements 33 to move inwardly toward each other so that the hook shaped retaining portions 36 thereof will engage the upwardly and outwardly inclined end portions 41 of the keeper elements 37. The resulting wedge engagement between the latch and keeper elements results in drawing the roof header downwardly so that a proper seal is made therebetween, and results in locking the roof header to the windshield header in the proper relationship. The centering pin 24 cooperates in centering the two. The release operation is of course the reverse.

It will be understood that the invention is not to be limited to the exact construction shown and described, but that various changes and modifications may be made without departing from the spirit and scope of the invention, as defined in the appended claims.

What is claimed is:

1. Lock mechanism for a motor vehicle body, comprising a pair of elongated latch elements mounted for transverse sliding movement, each of said latch elements having opposed inner end portions, threaded elements on the inner end portions of said latch elements, an electric motor mounted adjacent the inner end portions of said latch elements, threaded elements on said motor engaging the threaded elements on said latch elements to simultaneously move said latch elements in opposite transverse directions, said latch elements having opposed retaining portions at their laterally outer ends.

2. Latch mechanism for a motor vehicle body comprising a pair of elongated latch elements each having a retaining portion on its outer end, aligned means mounting said latching elements for sliding movement in the direction of their longitudinal axes, a reversible motor means, and means coupling said motor means to the inner ends of said latch elements, said motor means being selectively operable to simultaneously move said latch elements to and from latched position.

3. Latch mechanism for a motor vehicle body comprising a pair of operatively aligned elongated latch elements each having a retaining portion on its outer end and a threaded portion on its inner end, means mounting said latching elements for sliding movement in the direction of their longitudinal axes, and a motor means interposed between the inner end portions of said latch elements, said motor means having threaded elements thereon engaging said threaded portions to simultaneously move said latching elements to and from latching position.

References Cited in the file of this patent

UNITED STATES PATENTS

| | | |
|---|---|---|
| 1,142,052 | Paquette | June 8, 1915 |
| 1,646,899 | Cantrall | Oct. 25, 1927 |
| 2,560,459 | Lundberg et al. | July 10, 1951 |
| 2,586,648 | Hale et al. | Feb. 19, 1952 |
| 2,674,480 | Vigmostad | Apr. 6, 1954 |
| 2,709,621 | Votypka et al. | May 31, 1955 |
| 2,753,202 | Smith et al. | July 3, 1956 |